US008442123B2

(12) United States Patent
Amino (10) Patent No.: US 8,442,123 B2
(45) Date of Patent: May 14, 2013

(54) DEVICE, SIGNAL GENERATION/DECODING DEVICE, VIDEO TRANSMISSION DEVICE, VIDEO RECEPTION DEVICE, AND VIDEO TRANSMISSION/RECEPTION SYSTEM

(75) Inventor: Tadashi Amino, Tokyo (JP)

(73) Assignee: Sanyo Electric Co., Ltd., Osaka (JP)

( * ) Notice: Subject to any disclaimer, the term of this patent is extended or adjusted under 35 U.S.C. 154(b) by 1894 days.

(21) Appl. No.: 10/580,706

(22) PCT Filed: Oct. 28, 2004

(86) PCT No.: PCT/JP2004/016042
§ 371 (c)(1),
(2), (4) Date: May 25, 2006

(87) PCT Pub. No.: WO2005/053316
PCT Pub. Date: Jun. 9, 2005

(65) Prior Publication Data
US 2007/0081594 A1    Apr. 12, 2007

(30) Foreign Application Priority Data
Nov. 26, 2003    (JP) .................................. 2003-394889

(51) Int. Cl.
*H04B 1/66* (2006.01)
*H04N 7/12* (2006.01)
(52) U.S. Cl.
USPC .................................. 375/240.26; 375/240.01
(58) Field of Classification Search .................. 348/159, 348/143, 373, 154, 423.1, 97, 705, 706; 345/87; 375/132, 130, 135, 136, 138, 240.26, 240.24; 725/81
See application file for complete search history.

(56) References Cited

U.S. PATENT DOCUMENTS

| 5,543,852 | A | * | 8/1996 | Yuen et al. | 348/478 |
| 5,710,773 | A | | 1/1998 | Shiga | |
| 5,781,599 | A | * | 7/1998 | Shiga | 375/376 |
| 6,037,932 | A | * | 3/2000 | Feinleib | 348/478 |
| 6,125,232 | A | * | 9/2000 | Taira et al. | 386/243 |
| 6,249,532 | B1 | * | 6/2001 | Yoshikawa et al. | 370/486 |
| 6,310,922 | B1 | * | 10/2001 | Canfield et al. | 375/240.28 |

(Continued)

FOREIGN PATENT DOCUMENTS

| JP | 8-97837 | 4/1996 |
| JP | 11-004433 A | 1/1999 |

(Continued)

OTHER PUBLICATIONS

International Search Report for PCT/JP2004/016042 dated Mar. 15, 2005 (2 pages).

(Continued)

*Primary Examiner* — Behrooz Senfi
(74) *Attorney, Agent, or Firm* — Osha Liang LLP (57) ABSTRACT

By generating a transmission signal containing information on a video signal containing information on a video signal encoded in units of a video signal of a predetermined number of vertical periods and adding a flag indicating the header of the transmission signal to the header of the transmission signal, it is possible to extract the flag indicating the header of the transmission signal added to the header of the transmission signal which has been radio-received and decode the encoded video signal contained in the transmission signal at the timing in accordance with a reference signal outputted at the timing when the flag is extracted.

10 Claims, 4 Drawing Sheets

U.S. PATENT DOCUMENTS

| | | | |
|---|---|---|---|
| 7,010,032 B1* | 3/2006 | Kikuchi et al. | 375/240.01 |
| 2001/0006578 A1* | 7/2001 | Usui et al. | 386/94 |
| 2002/0004936 A1* | 1/2002 | Aras | 725/36 |
| 2002/0050969 A1* | 5/2002 | Ohura | 345/87 |
| 2002/0075256 A1* | 6/2002 | Hiltunen et al. | 345/213 |
| 2003/0189638 A1* | 10/2003 | Fry | 348/154 |
| 2004/0235507 A1* | 11/2004 | Amino | 455/502 |

FOREIGN PATENT DOCUMENTS

| | | |
|---|---|---|
| JP | 2000-324136 | 11/2000 |
| JP | 2003-8932 | 1/2003 |
| JP | 2003032689 A | 1/2003 |

OTHER PUBLICATIONS

Official Journal of the Institute of Television Engineers, Image Engineering and Broadcasting Technology, "Special Edition for MPEG", vol. 49, No. 4, Serial No. 560, p. 440, dated Apr. 20, 1995.

Patent Abstracts of Japan 2000-324136 dated Nov. 24, 2000 (10 pages).

Patent Abstracts of Japan 08-097837 dated Apr. 12, 1996 (9 pages).

Patent Abstracts of Japan 2003-008932 dated Jan. 10, 2003 (7 pages).

Japanese Office Action for Application No. 2005-515746, mailed on Oct. 5, 2010 (4 pages).

"Feature Article: MPEG", The Journal of the Institute of Television Engineers of Japan: Image Information Engineering and Broadcast Tecnology, Japan Institute of Television Engineers of Japan, Apr. 20, 1995, vol. 49, No. 4, p. 440.

esp@cenet Patent Abstract for Japanese Publication No. 11-004433, publication date Jan. 6, 1999. (1 page).

esp@cenet Patent Abstract for Japanese Publication No. 2003-032689, publication date Jan. 31, 2003. (1 page).

\* cited by examiner

DEVICE, SIGNAL GENERATION/DECODING DEVICE, VIDEO TRANSMISSION DEVICE, VIDEO RECEPTION DEVICE, AND VIDEO TRANSMISSION/RECEPTION SYSTEM

TECHNICAL FIELD

The present invention relates to a radio video transmission device, a radio video reception device, a radio video transmission/reception system, a signal generation device, a signal decoding device, and a signal generation/decoding device, and is used for radio transmission of video from a main television device (a master television device) to a slave television device, for example.

BACKGROUND ART

In digital broadcasting systems, video and voice signals are compressed by MPEG (Moving Picture Experts Group) compression encoding technique, for example, and a multiplexed transport stream (TS) is digitally modulated and transmitted as a digital modulation signal. On a receiver side, the received digital modulation signal is demodulated to generate a transport stream, which is divided and analyzed into video, voice, and other information. Thus, a video image such as a program is indicated on a display.

Figure 4:
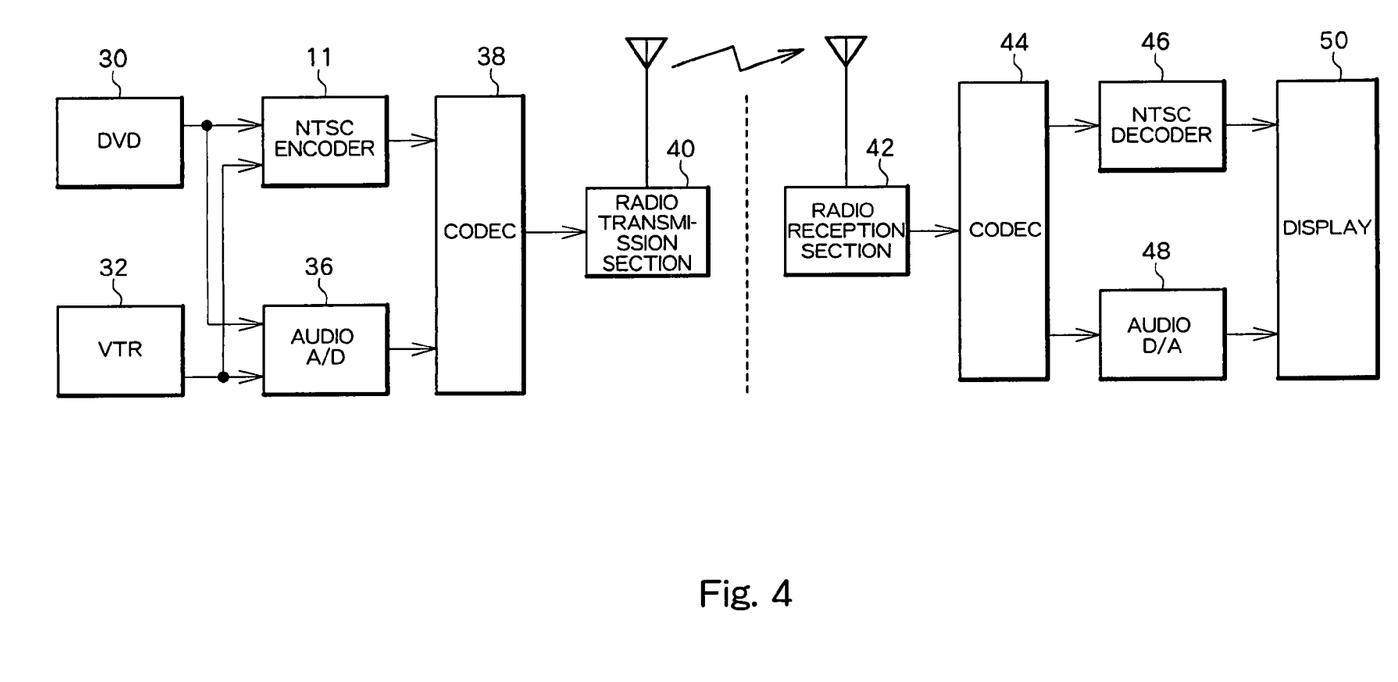
FIG. 4 is a block diagram showing a structure of a radio video transmission/reception system.

FIG. 4 shows a structure of a radio video transmission/reception system in a digital broadcasting system. Each of a video signal and a voice signal output from a DVD 30 and a VTR 32 is input to an NTSC encoder 11 and an audio analog-to-digital converter 36 where an analog signal is converted into a digital signal. The resultant digital signals are then input to a codec 38 where the digital signals are subjected to predetermined processing such as compression processing, and output as a transport stream. The transport stream is then modulated in a radio transmission section 40 and is output as a radio signal.

Meanwhile, the transmitted radio signal which is received by a radio reception section 42 of a radio video reception device. The received radio signal is input to a codec 44 where the input radio signal is subjected to expansion (decompression) processing, which is an inverse process of that applied by the codec 38, to thereby obtain a video signal and a voice signal. The video signal and the voice signal are further input to an NTSC decoder 46 and an audio digital-to-analog converter 48, respectively. The NTSC decoder 46 and the audio digital-to-analog converter 48 apply digital-to-analog conversion to the video signal and the voice signal to generate respective analog signals, which are then output to a display 50. In this manner, a video signal which is radio-transmitted can be displayed on the display 50.

Here, in order to achieve clock synchronization between the transmission side and the reception side of such a digital broadcasting system, the codec 38 and the codec 44 multiplex the transport stream with PCR (program clock reference).

More specifically, on the transmission side, PCR data are inserted for each packet of decoding and reproduction called an access unit. Meanwhile, on the reception side, the portion in which the PCR data are inserted is detected on the basis of description of a PMT (program map table) so that an STC (system time clock) can be extracted from the PCR data, and the STC is then supplied to a clock reproduction section. The clock reproduction section includes a voltage controlled oscillator (27 MHz, free-running), a counter, or the like, thereby forming a PLL (phase locked loop) circuit, and adjusts the timing for reproducing a video signal on the basis of the clock period represented by a value of the counter and the value of STC which is received (see Japanese Patent Laid-Open Publication No. 2003-8932).

Recently, there has been proposed a reception system including a main body reception device (a main television device) which receives digital broadcast and a slave television device which receives and displays video and voice data which are radio-transmitted from the main body reception device. In such a reception system, as in the digital broadcasting system described above, a transport stream is subjected to digital modulation and transmitted, and the transport stream is multiplexed with PCR so as to achieve clock synchronization.

However, use of PCR for the purpose of achieving clock synchronization, as described above, raises a problem that the scale of a radio transmission circuit is increased.

In view of the above circumstances, the present invention advantageously provides a radio video transmission device, a radio video reception device, a radio video transmission/reception device, a signal generation device, a signal decoding device, and a signal generation/decoding device, capable of clock synchronization of video between transmission and reception sides with a simple circuit structure.

DISCLOSURE OF THE INVENTION

The present invention provides a signal generation device for generating an encoded transmission signal which is used for transmitting a video signal through radio communication, wherein a transmission signal containing information obtained by encoding a video signal in units of a video signal corresponding to a predetermined number of vertical periods is generated, and a flag indicative of a header portion of the transmission signal is added to the header portion of the transmission signal. The present invention also provides a radio video transmission device including this signal generation device.

Further, the present invention provides a signal decoding device for decoding a transmission signal received through radio communication, comprising a flag extraction section which extracts a flag indicative of a header portion of the transmission signal added to the header portion of the transmission signal which is radio-received, wherein an encoded video signal included in the transmission signal is decoded at timing in accordance with a reference signal output from the flag extraction section. The present invention further provides a radio video reception device including this signal decoding device.

Also, the present invention may provide a signal generation/decoding device or a radio video transmission/reception system including the above signal generation device and the above signal decoding device.

DETAILED DESCRIPTION OF PREFERRED EMBODIMENT

Figure 1:
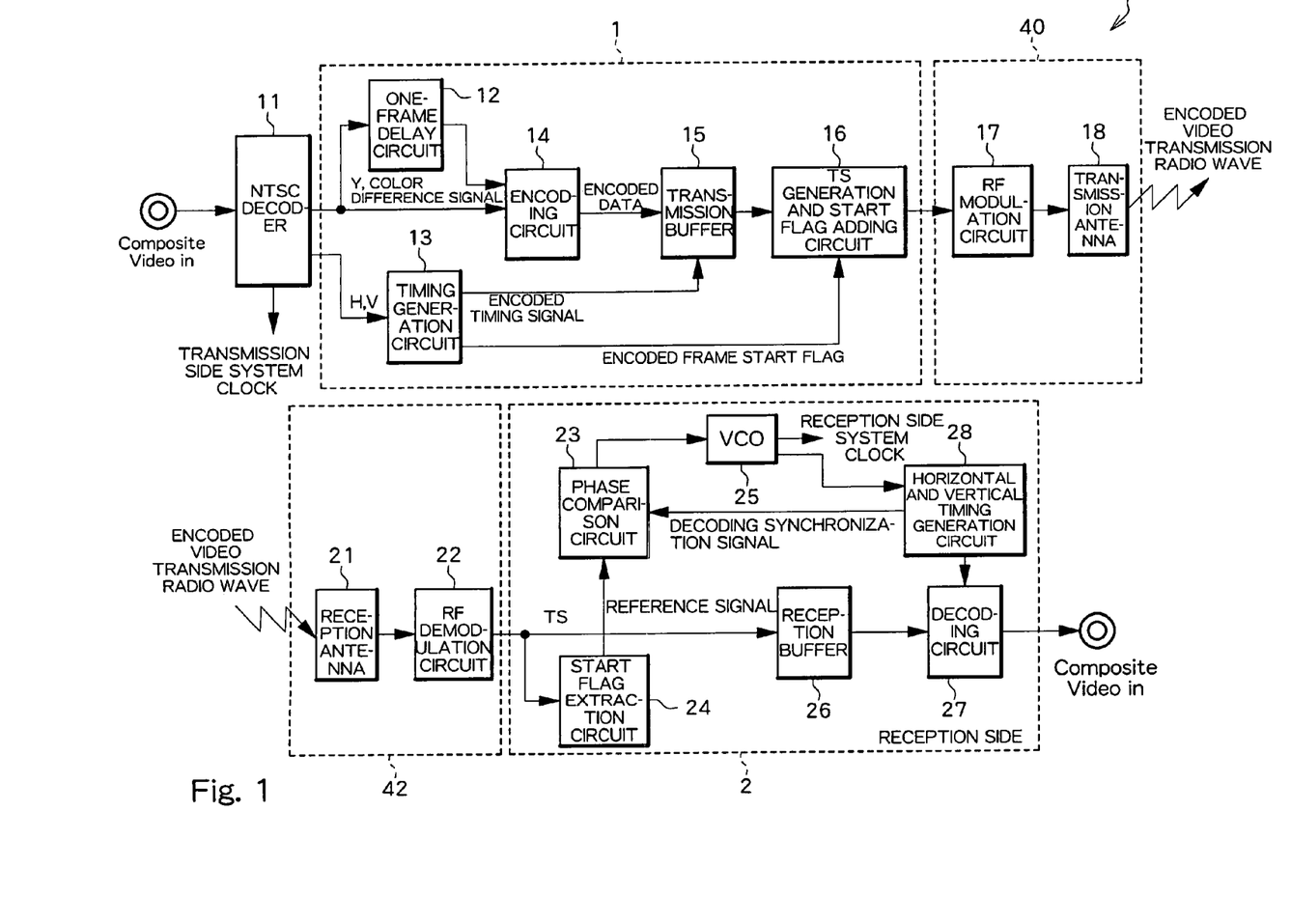
FIG. 1 is a block diagram showing a radio video transmission/reception system according to an embodiment of the present invention.
Figure 2:
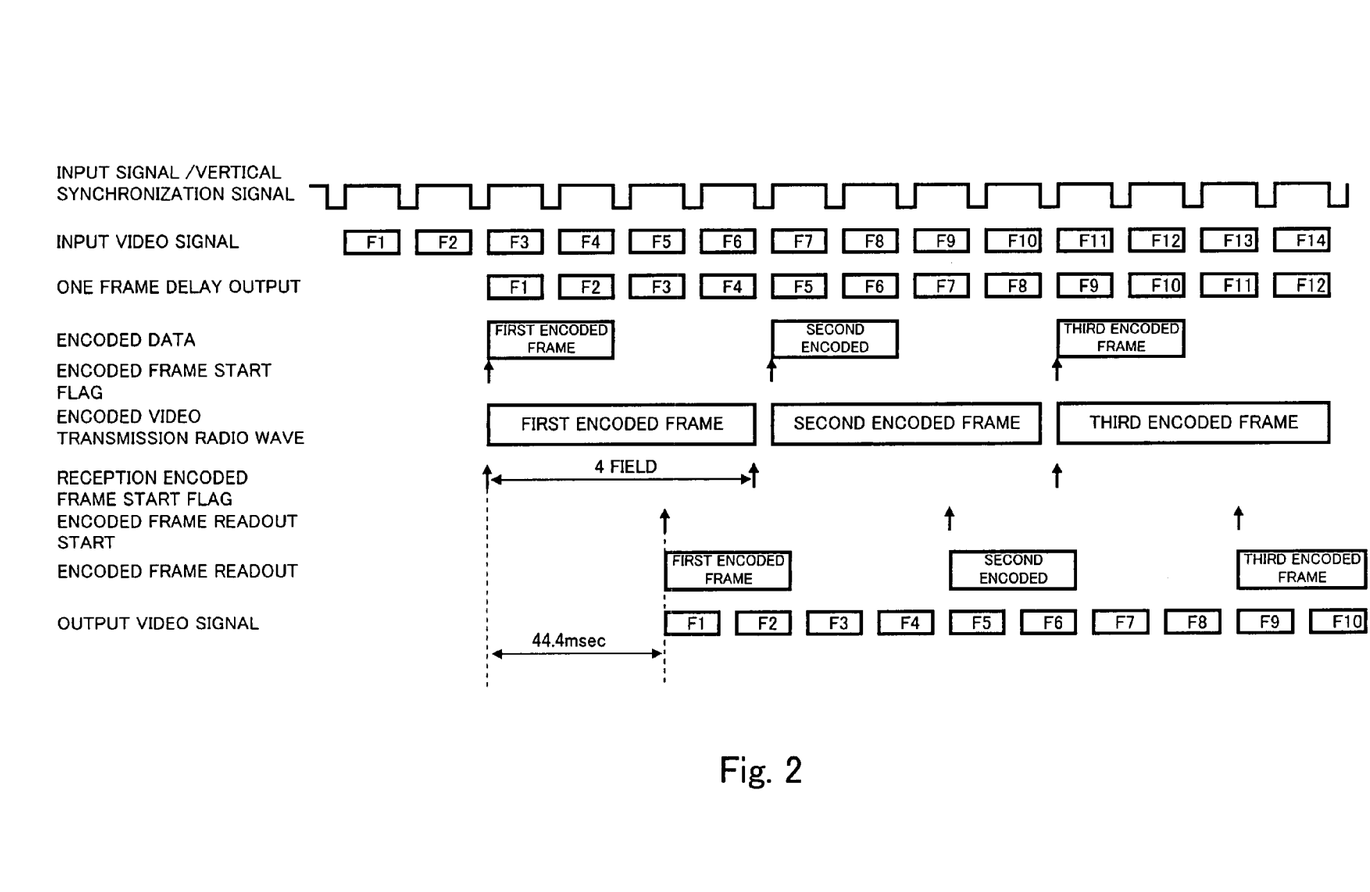
FIG. 2 is a timing chart showing timing of each signal.
Figure 3:
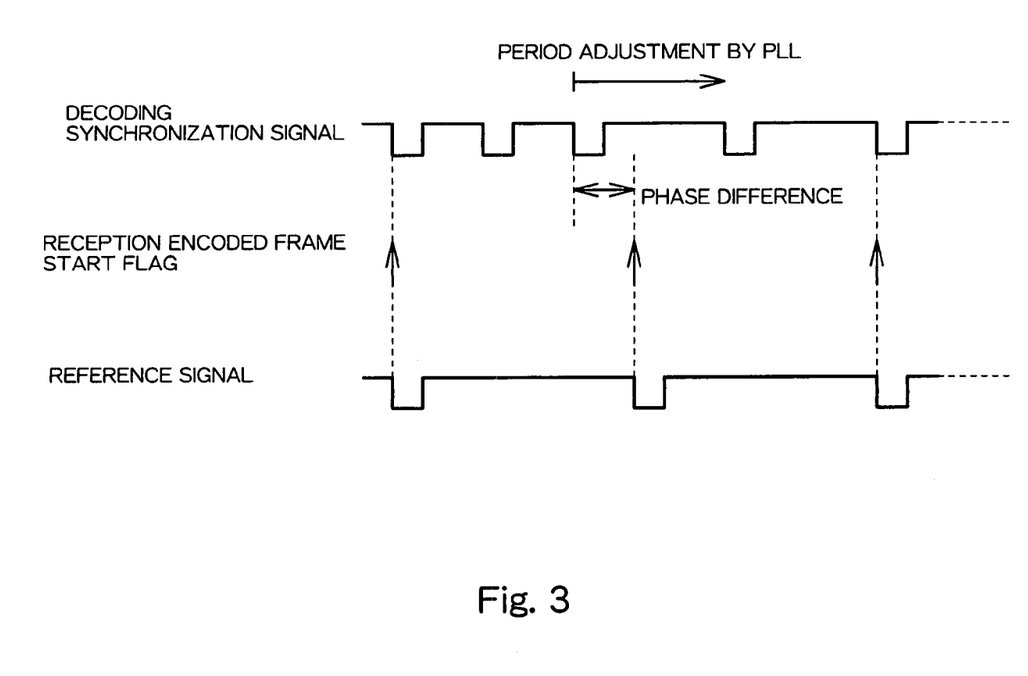
FIG. 3 is a timing chart for explaining phase adjustment between a reference signal and a decoding synchronization signal.

A preferred embodiment of the present invention will be described with reference to FIGS. 1 to 3. FIG. 1 is a block diagram showing a radio video transmission/reception system 3, and FIGS. 2 and 3 are timing charts.

[Summary of the Embodiment]

In this embodiment, a video signal of the NTSC (interlace) method in which a video signal corresponding to two fields forms one screen (one frame) will be described as an example. Further, a video signal which is encoded in units of a video signal corresponding to a predetermined number of vertical periods will be referred to as an encoded frame. In the present embodiment, the encoded video signal corresponding to four fields will be referred to as one encoded frame.

A radio video transmission device sets a transmission interval of the header data of the encoded frame to a predetermined number of vertical periods. Assuming that the length of one encoded frame is four fields, the transmission interval of the header data of the encoded frame is four fields. The radio video transmission device adds to a header portion of the encoded frame a flag indicative of the header portion of the encoded frame. A radio video reception device generates a clock pulse at the encoded frame periods from a built-in horizontal period counter and a vertical period counter. The radio video reception device forms a PLL (Phase Locked Loop) on the basis of a phase difference between the period of the clock pulse and the period of reception of the flag indicative of the header of an encoded frame, thereby adjusting the period of the clock pulse to achieve clock synchronization. Thus, the present embodiment eliminates the need for adding PCR to thereby provide a radio video transmission/reception system having a simple circuit structure.

[Radio Video Transmission Device]

A radio video transmission device of the present embodiment may have a structure similar to that of the radio video transmission/reception device shown in FIG. 4, except that the codec 38 is replaced with a codec 1. The codec 1 corresponds to a signal generation device.

The NTSC encoder 11 receives a composite video signal and separates a Y (luminance) signal, a color difference signal, a horizontal synchronization signal (H), and a vertical synchronization signal (V) from the composite video signal. The Y signal, the color difference signal, the H signal, and the V signal are then supplied from the NTSC encoder 11 to the codec 1.

To an encoder circuit 14, the Y signal and the color difference signal one frame (two fields) before the present time, which have been subjected to a processing in a one-frame delay circuit 12, are input, along with the Y signal and the color difference signal at the present time. As shown in FIG. 2, the first encoded frame is composed of an encoded input video signal (F1, F2, F3, and F4: F refers to a field) corresponding to four fields. As shown in FIG. 2, the encoder circuit 14 encodes the input video signal (F1, F2, F3, and F4) corresponding to four fields to generate the first encoded frame, and outputs the encoded frame at intervals of every other frame period (every four vertical synchronization signals) to a transmission buffer 15. A frame synchronization signal which is a timing signal is generated by a timing generation circuit 13 and supplied to the transmission buffer 15. The timing generation circuit 13 outputs the frame synchronization signal at intervals of every two vertical synchronization periods (every two fields) on the basis of the H (horizontal synchronization signal) signal and the V (vertical synchronization signal) signal supplied from the NTSC decoder 11. Further, the timing generation circuit 13 generates an encoded frame start flag and supplies the encoded frame start flag to a TS generation circuit 16 at intervals of every two frame synchronization signals (every four fields).

Because the data amount of the encoded frame varies depending on the content of video, the output bit rate also varies. The transmission buffer 15 outputs the encoded data which are input at a fixed bit rate in synchronization with the frame synchronization signal.

The TS generating circuit 16 receives an output from the transmission buffer 15 and converts the output into an MPEG2-based TS (transport stream). At this time, the TS generating circuit 16 adds the encoded frame start flag supplied from the timing generating circuit 13 to a top portion (a header portion) of the TS packet. In this case, as one encoded frame includes an encoded video signal corresponding to four fields, the encoded frame start flag is added to a video signal of every four fields.

An RF modulation circuit 17 of the radio transmission section 40 receives a transport stream (TS) output from the TS generating circuit 16 and applies high-frequency digital modulation processing to the transport stream (TS). The resultant RF modulation signal (a transmission wave) is transmitted from a transmission antenna section 18 into a space as an encoded video transmission radio wave.

Referring to FIG. 2, the transmission time for the first and third encoded frames which are encoded video transmission radio waves is longer due to the greater amount of data, as compared with the transmission time for the second frame having a smaller amount of data than the first and third encoded frames, as an encoded video transmission radio wave.

[Radio Video Reception Device]

A radio video reception device of the present embodiment may have a structure which is similar to that of the radio video transmission/reception device shown in FIG. 4, except that the codec 44 is replaced with a codec 2. The codec 2 corresponds to a signal decoding device. Further, the codec 1 and the codec 2 may be formed into a single signal generating and decoding device.

The radio video reception device receives the encoded video transmission radio wave (RF modulation signal) transmitted from the radio video transmission device at a reception antenna 21. An RF demodulation circuit 22 applies digital demodulation processing to the received signal and outputs the processed signal as a demodulation TS to the codec 2.

The demodulation TS is temporarily stored in a reception buffer 26. A demodulation circuit 27 sequentially reads out and demodulates the demodulation TS stored in the reception buffer 26 in accordance with the timing required for demodulation. The timing is determined at a horizontal/vertical timing generating circuit 28.

A start flag extraction circuit 24 extracts the encoded frame start flag from the header portion of the demodulation TS, and supplies a reference signal to a phase comparison circuit 23 at this timing of extraction of the encoded frame start flag. The horizontal/vertical timing generating circuit 28 outputs a demodulation synchronization signal indicative of the reading start timing of the header of the encoded frame to the phase comparison circuit 23 and the demodulation circuit 27. The phase comparison circuit 23, which has received the reference signal, receives this demodulation synchronization signal as another signal, and outputs a phase comparison output indicative of a phase difference between the reference signal and the demodulation synchronization signal to a voltage controlled oscillator (VCO) 25. The horizontal/vertical timing generating circuit 28 adjusts and outputs the period of the demodulation synchronization signal in accordance with the oscillation frequency of the voltage controlled oscillator 25. With this structure, there can be formed a phase lock loop (PLL) for outputting a demodulation synchronization signal in synchronism with the timing for extraction of the encoded frame start flag indicative of the header of an encoded frame.

More specifically, as shown in FIG. 3, the period of the demodulation synchronization signal output from the horizontal/vertical timing generating circuit 28 is corrected whenever necessary by the PLL formed by the horizontal/vertical timing generating circuit 28, the phase comparison circuit 23, and the voltage controlled oscillator 25, in accordance with the encoded frame start flag added to the TS which is being transmitted. The demodulation circuit 27 then demodulates the demodulation TS stored in the reception buffer 26 into a video signal in synchronization with the demodulation synchronization signal.

More specifically, encoding (compression) of the video signal is performed in units of a video signal corresponding to a predetermined number of vertical periods (four fields in the above example). Here, while the amount of data generated by this encoding varies, the transmission intervals of data of the header of an encoded video signal corresponding to a predetermined number of vertical periods are always held in an unit of a predetermined number of vertical synchronization signals (i.e., the encoded frame start flag is transmitted at such intervals). Consequently, on the reception side, decoding is performed on the basis of the encoded frame start flag which is received at fixed intervals, thereby achieving clock synchronization of video signal reception.

Further, by supplying an oscillation signal output from the voltage controller oscillator 25 to the NTSC decoder 46, the audio digital/analog converter 48, the display 50, and the like, which are provided at the subsequent stages, the signal processing and the display processing can be performed in synchronization with the timing for decoding the video signal.

Although in the above example the unit of a predetermined number of vertical synchronization signals is four fields and compression (encoding) is performed on the basis of the difference between two frames, the present invention is not limited to this structure. For example, it is also possible that the unit of the predetermined number of vertical synchronization signals is set to sixteen fields and B picture (bidirectionally predictive encoded picture) may be generated as compression (encoding) on the basis of a difference between frames. Here, because PCR is not provided, separate information in place of the description of the PTS (presentation time stamp) and DTS (decoding time stamp) can be provided in the PES (packetized elementary stream).

What is claimed is:

1. A radio video transmission device for encoding a video signal and radio-transmitting the encoded video signal, the radio video transmission device being configured such that encoding is performed in units of a video signal corresponding to a predetermined number of vertical periods, time intervals at which data of a header of the encoded video signal corresponding to the predetermined number of vertical periods is transmitted conform to the predetermined number of vertical periods, and during transmission of the header data of the video signal corresponding to the predetermined number of vertical periods, information indicative of the header data is multiplexed and transmitted.

2. A signal generation device for generating an encoded transmission signal which is used for transmitting a video signal through radio communication, wherein
    a transmission signal including information obtained by encoding a video signal in units of a video signal corresponding to a predetermined number of vertical periods is generated, and
    a flag indicative of a header portion of the transmission signal is added to the header portion of the transmission signal such that time intervals at which data of a header of the encoded video signal corresponding to the predetermined number of vertical periods is transmitted conform to the predetermined number of vertical periods.

3. A radio video reception device for radio-receiving the transmission signal generated by the signal generation device according to claim 2, comprising:
    a flag extraction section which extracts the flag indicative of a header portion of a received transmission signal added to the header portion of the transmission signal and outputs a reference signal at timing of extraction of the flag;
    a phase comparison section which outputs a phase comparison output signal in accordance with a phase difference of periods between a decoding synchronization signal and the reference signal output from the flag extraction section;
    a voltage controlled oscillator which outputs an oscillation signal having an oscillation frequency in accordance with the phase comparison output signal output from the phase comparison section; and
    a timing generation section which outputs, as the decoding synchronization signal, a signal corresponding to the frequency of the oscillation signal output from the voltage controlled oscillator,
    wherein an encoded video signal included in the transmission signal is decoded in synchronization with the decoding synchronization signal.

4. A signal decoding device for radio-receiving the transmission signal generated by the signal generation device according to claim 2 and decoding the transmission signal, comprising:
    a flag extraction section which extracts the flag indicative of a header portion of the transmission signal added to the header portion of the transmission signal which is radio-received,
    wherein an encoded video signal included in the transmission signal is decoded at timing in accordance with a reference signal output from the flag extraction section.

5. A signal decoding device according to claim 4, comprising:
    a phase comparison section which outputs a phase comparison output signal in accordance with a phase difference of periods between a decoding synchronization signal and the reference signal output from the flag extraction section;
    a voltage controlled oscillator which outputs an oscillation signal having an oscillation frequency in accordance with the phase comparison output signal output from the phase comparison section; and
    a timing generation section which outputs, as the decoding synchronization signal, a signal corresponding to the frequency of the oscillation signal output from the voltage controlled oscillator,
    wherein the encoded video signal included in the transmission signal is decoded in synchronization with the decoding synchronization signal.

6. A radio video transmission/reception system comprising a radio video transmission device according to claim 1; and
    a radio video reception device for radio-receiving a video signal which is encoded, comprising:
        a flag extraction section which extracts a flag indicative of a header portion of a received transmission signal added to the header portion of the transmission signal and outputs a reference signal at timing of extraction of the flag;

a phase comparison section which outputs a phase comparison output signal in accordance with a phase difference of periods between a decoding synchronization signal and the reference signal output from the flag extraction section;

a voltage controlled oscillator which outputs an oscillation signal having an oscillation frequency in accordance with the phase comparison output signal output from the phase comparison section; and a timing generation section which outputs, as the decoding synchronization signal, a signal corresponding to the frequency of the oscillation signal output from the voltage controlled oscillator, wherein an encoded video signal included in the transmission signal is decoded in synchronization with the decoding synchronization signal.

7. A signal generation/decoding device comprising a signal generation device according to claim 2; and a signal decoding device for decoding a transmission signal received through radio communication, comprising: a flag extraction section which extracts a flag indicative of a header portion of the transmission signal added to the header portion of the transmission signal which is radio-received, wherein an encoded video signal included in the transmission signal is decoded at timing in accordance with a reference signal output from the flag extraction section.

8. A video transmission device for encoding a video signal and transmitting the encoded video signal, the video transmission device being configured such that encoding is performed in units of a video signal corresponding to a predetermined number of vertical periods, time intervals at which data of a header of the encoded video signal corresponding to the predetermined number of vertical periods is transmitted conform to the predetermined number of vertical periods, and during transmission of the header data of the video signal corresponding to the predetermined number of vertical periods, information indicative of the header data is multiplexed and transmitted.

9. A video reception device for receiving an encoded video signal, comprising:

a flag extraction section which extracts a flag indicative of a header portion of a received transmission signal added to the header portion of the transmission signal and outputs a reference signal at timing of extraction of the flag;

a phase comparison section which outputs a phase comparison output signal in accordance with a phase difference of periods between a decoding synchronization signal and the reference signal output from the flag extraction section;

a voltage controlled oscillator which outputs an oscillation signal having an oscillation frequency in accordance with the phase comparison output signal output from the phase comparison section; and a timing generation section which outputs, as the decoding synchronization signal, a signal corresponding to the frequency of the oscillation signal output from the voltage controlled oscillator, wherein an encoded video signal included in the transmission signal is decoded in synchronization with the decoding synchronization signal.

10. A video reception/transmission system comprising a video transmission device and a video reception device, wherein the video transmission device is configured such that encoding is performed in units of a video signal corresponding to a predetermined number of vertical periods, time intervals at which data of a header of the encoded video signal corresponding to the predetermined number of vertical periods is transmitted conform to the predetermined number of vertical periods, and during transmission of the header data of the video signal corresponding to the predetermined number of vertical periods, information indicative of the header data is multiplexed and transmitted;

a flag extraction section which extracts a flag indicative of a header portion of a received transmission signal added to the header portion of the transmission signal and outputs a reference signal at timing of extraction of the flag;

a phase comparison section which outputs a phase comparison output signal in accordance with a phase difference of periods between a decoding synchronization signal and the reference signal output from the flag extraction section;

a voltage controlled oscillator which outputs an oscillation signal having an oscillation frequency in accordance with the phase comparison output signal output from the phase comparison section;

a timing generation section which outputs, as the decoding synchronization signal, a signal corresponding to the frequency of the oscillation signal output from the voltage controlled oscillator; and a video reception device which decodes the encoded video signal included in the transmission signal in synchronization with the decoding synchronization signal.

* * * * *

UNITED STATES PATENT AND TRADEMARK OFFICE
CERTIFICATE OF CORRECTION

| | | |
|---|---|---|
| PATENT NO. | : 8,442,123 B2 | |
| APPLICATION NO. | : 10/580706 | |
| DATED | : May 14, 2013 | |
| INVENTOR(S) | : Tadashi Amino | |

It is certified that error appears in the above-identified patent and that said Letters Patent is hereby corrected as shown below:

On the Title page, item (54) and in the Specification, Col. 1, lines 1-4:

The title of the invention should read -- RADIO VIDEO TRANSMISSION DEVICE, RADIO VIDEO RECEPTION DEVICE, RADIO VIDEO TRANSMISSION/RECEPTION SYSTEM, SIGNAL GENERATION DEVICE, SIGNAL DECODING DEVICE, SIGNAL GENERATION/DECODING DEVICE, VIDEO TRANSMISSION DEVICE, VIDEO RECEPTION DEVICE, AND VIDEO TRANSMISSION/RECEPTION SYSTEM --

Signed and Sealed this
Eighth Day of October, 2013

Teresa Stanek Rea
*Deputy Director of the United States Patent and Trademark Office*